United States Patent
Moss et al.

(10) Patent No.: US 12,428,908 B1
(45) Date of Patent: Sep. 30, 2025

(54) METHODS OF FABRICATING COMPOSITE ARTICLES

(71) Applicant: LITTLE GIANT LADDER SYSTEMS, LLC, Springville, UT (US)

(72) Inventors: N. Ryan Moss, Mapleton, UT (US); Bryan Wright, Highland, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 1196 days.

(21) Appl. No.: 17/129,518

(22) Filed: Dec. 21, 2020

Related U.S. Application Data

(62) Division of application No. 15/919,988, filed on Mar. 13, 2018, now Pat. No. 10,871,031.

(Continued)

(51) Int. Cl.
| | |
|---|---|
| B29C 70/52 | (2006.01) |
| E06C 7/08 | (2006.01) |
| B29K 75/00 | (2006.01) |
| B29K 309/08 | (2006.01) |
| B29L 31/00 | (2006.01) |
| E06C 1/12 | (2006.01) |
| E06C 7/42 | (2006.01) |

(52) U.S. Cl.
CPC ............... *E06C 7/08* (2013.01); *B29C 70/52* (2013.01); *B29K 2075/00* (2013.01); *B29K 2309/08* (2013.01); *B29K 2995/002* (2013.01); *B29L 2031/745* (2013.01); *E06C 1/12* (2013.01); *E06C 7/423* (2013.01)

(58) Field of Classification Search
CPC ...................................................... B29C 70/52
See application file for complete search history.

(56) References Cited

U.S. PATENT DOCUMENTS

| | | | |
|---|---|---|---|
| 5,079,281 A | * | 1/1992 | Takeuchi ............... C08L 23/12 524/487 |
| 5,724,775 A | | 3/1998 | Zobel, Jr. et al. |

(Continued)

FOREIGN PATENT DOCUMENTS

| | | | |
|---|---|---|---|
| CA | 2508885 | * | 1/2011 |
| JP | 4408180 | * | 2/2010 |

(Continued)

OTHER PUBLICATIONS

"Mighty Lite" as found at https://cdn.littlegiantladders.com/15385-001/flyer/little-giant-ladder-systems-15385-001.pdf (Year: 2018).*

(Continued)

*Primary Examiner* — Edmund H Lee
(74) *Attorney, Agent, or Firm* — Dorsey & Whitney LLP

(57) ABSTRACT

Composite articles of manufacture and methods of making the same are provided herein. In one embodiment, a composite article includes a fiberglass component having a color of pantone 376C. Subjecting the fiberglass component to various environmental conditions result in the fiberglass component exhibiting a color of pantone 383C. Thus, the fiberglass component does not fade and become lighter or hazy in appearance, but takes on an appearance of deeper hue and/or saturation, providing longer life of the appearance of the fiberglass component.

15 Claims, 6 Drawing Sheets
(5 of 6 Drawing Sheet(s) Filed in Color)

Related U.S. Application Data

(60) Provisional application No. 62/470,752, filed on Mar. 13, 2017.

(56) References Cited

U.S. PATENT DOCUMENTS

| | | | |
|---|---|---|---|
| 5,750,616 A * | 5/1998 | Shimpuku | C08K 3/04 |
| | | | 524/495 |
| 6,301,004 B1 | 10/2001 | Jung et al. | |
| 6,794,032 B2 * | 9/2004 | Borgner | C08L 23/10 |
| | | | 524/214 |
| 7,086,499 B2 | 8/2006 | Moss | |
| 8,365,865 B2 | 2/2013 | Moss et al. | |
| 8,376,087 B2 | 2/2013 | Moss et al. | |
| 8,418,811 B2 | 4/2013 | Kelly | |
| 8,701,831 B2 | 4/2014 | Moss et al. | |
| 8,997,930 B2 | 4/2015 | Moss et al. | |
| 9,145,733 B2 | 9/2015 | Worthington et al. | |
| 9,163,455 B2 | 10/2015 | Moss et al. | |
| D775,362 S | 12/2016 | Ho | |
| 9,534,443 B1 | 1/2017 | Bogart et al. | |
| 10,871,031 B1 | 12/2020 | Moss et al. | |
| 2003/0008144 A1 | 1/2003 | Whitney et al. | |
| 2004/0077778 A1 | 4/2004 | Hazan et al. | |
| 2005/0281999 A1 | 12/2005 | Hofmann et al. | |
| 2008/0014117 A1 | 1/2008 | Questel et al. | |
| 2008/0182930 A1 | 7/2008 | Adachi | |
| 2009/0266722 A1 | 10/2009 | Rogers et al. | |
| 2009/0302237 A1 | 12/2009 | Bortz et al. | |
| 2011/0269131 A1 | 11/2011 | Chiu et al. | |
| 2014/0030522 A1 * | 1/2014 | Choiniere | B29C 70/06 |
| | | | 428/394 |
| 2014/0106139 A1 | 4/2014 | Abrams | |
| 2015/0068842 A1 | 3/2015 | Moss et al. | |
| 2015/0227803 A1 | 8/2015 | Zangari et al. | |
| 2016/0123079 A1 * | 5/2016 | Ballard | E06C 7/06 |
| | | | 182/207 |
| 2018/0094488 A1 | 4/2018 | Major et al. | |
| 2018/0126664 A1 | 5/2018 | Okawa | |
| 2019/0098946 A1 | 4/2019 | Bee et al. | |
| 2020/0017264 A1 | 1/2020 | Scott | |

FOREIGN PATENT DOCUMENTS

| | | | |
|---|---|---|---|
| JP | 2015218274 | * | 12/2015 |
| KR | 200146389 Y1 | | 6/1999 |

OTHER PUBLICATIONS

Bailey Extension Ladders—web pages http://baileyladders.com.au/products-2012/fsxn-v-bracket-pole-support-fibreglass-130kg as archived on Jun. 18, 2013, by web.archive.org/web/20120318172408/http://baileyladders.com.au/products-2012/fsxn-v-bracket-pole-support-fibreglass-130kg (2 pages).

Chromaflo Technologies HDR Urethane Colorant Product Sheet, Revised Sep. 2012, downloaded from https://web.archive.org/web/20170607063 www.chromaflo.com/Chromaflo/files53/530ed822-be77-4be1-9b5a-a0be9b79614.pdf. (Year: 2012).

Chromaflo Technologies UV Technology webpaig, available on or bfore Nov. 29, 2017 as documented and found on https://web.archive.org/web/20171129084724/http://www.chromaflo.com/en-US/Industry-Leadership/Research-Development/UV-Technology.aspx (Year: 2017).

Reynolds Advanced Material, UVO(R) UV-Resistant Coatings, available on or before Mar. 8, 2017 as downloaded from and documented by https://web.archive.org/web/20170308144320/https://www.reynoldsam.com/product/.uvo (Year: 2017).

Paint and Coatings Magazine "Complex Inorganic Color Pigments: Durable Pigments for Demanding Applications" Apr. 11, 2000; downloaded from https://www.pcimag.com/articles/86037-complex-inorganic-color-pigments-durable-pigments-for-demanding-applications (Year: 2000).

https://web.archive.org/web/*/pantone.com Published Dec. 31, 2014 (Year: 2014).

https://www.pantone.com Published Oct. 16, 1997 (Year: 1997).

* cited by examiner

METHODS OF FABRICATING COMPOSITE ARTICLES

CROSS-REFERENCE TO RELATED APPLICATIONS

This application is a divisional of U.S. patent application Ser. No. 15/919,988, filed on 13 Mar. 2018, now U.S. Pat. No. 10,871,031, which claims the benefit of U.S. Provisional Patent Application No. 62/470,752, filed on 13 Mar. 2017, the disclosures of which are incorporated by reference herein in their entireties.

BACKGROUND

Ladders are conventionally utilized to provide a user thereof with improved access to elevated locations that might otherwise be inaccessible. Ladders come in many shapes and sizes, including straight ladders, extension ladders, stepladders, and combination step and extension ladders. So-called combination ladders may incorporate, in a single ladder, many of the benefits of multiple ladder designs.

Ladders known as straight ladders or extension ladders are ladders that are conventionally not self-supporting but, rather, are positioned against an elevated surface, such as a wall or the edge of a roof, to support the ladder at a desired angle. A user then ascends the ladder to obtain access to an elevated area, such as access to an upper area of the wall or access to a ceiling or the roof. A pair of feet or pads, each being coupled to the bottom of an associated rail of the ladder, are conventionally used to engage the ground or some other supporting surface.

In many cases, ladders are constructed from composite materials such as fiberglass. For example, the rails of ladders are often formed of a fiberglass or other composite material in an effort to provide a ladder that is lightweight and/or nonconductive. Having a lightweight ladder is often important in being able to transport and set up a ladder. Having a ladder that is not electrically conductive is important to a variety of workmen, such as electricians and utility workers, that often work around power lines or power equipment and need a ladder that does not potentially conduct electricity from the power source to ground.

Fiberglass components used in ladders, and in other structures and devices, are often colored for aesthetic purposes, functional purposes, or both. For example, often ladder rails are colored for purposes related to trade dress (so that a buyer can quickly identify the source of the ladder), for safety purposes (e.g., to make the ladder more visible to users and others in an area where the ladder is being used), for other reasons, or for a combination of such purposes.

However, one difficulty that has plagued the ladder industry, as well as other industries utilizing fiberglass components, is the fading of the color of the fiberglass material. For example, a ladder (or other device or structure) may include components made of yellow or orange fiberglass materials. After exposure to environmental conditions, including exposure to the UV rays of the sun, the yellow or orange color may fade, significantly reducing-if not eliminating-any safety benefits (e.g., attempts to improve visibility) provided by the use of such a color. The fading of the color is sometimes described as having a something of a "translucent" look, although this is not technically correct since the materials may still be generally opaque. Rather, the materials take on a look that is reduced in color saturation and have something of a hazy or milky look to them. Oftentimes, when the ladder or other structure is used on a daily basis, such fading may occur in as little as a year or less of time.

One example of this fading can be seen in FIGS. 1A and 1B wherein color photos depict a sample shown as a newly fabricated, black resin-based component 10 (e.g., fiberglass material) prior to weathering/environmental exposure (see FIG. 1A) and as a faded black resin-based component 12 after weathering/exposure (see FIG. 1B). Another example of this fading can be seen in FIGS. 2A and 2B, wherein color photos depict a sample that is shown as a newly fabricated orange resin-based component 20 (e.g., fiberglass material) prior to weathering/environmental exposure (see FIG. 2A) and as a faded orange resin-based component 22 after weathering/exposure (see FIG. 2B). It is clear that the hue and/or saturation of color of these prior art fiberglass components lightens subsequent to exposure to environmental conditions, significantly altering its appearance.

For these reasons and others, there is a continuing desire in the industry to provide improved functionality of ladders and also to other industries utilizing composite materials such as fiberglass.

SUMMARY

The present disclosure is related to composite articles of manufacture and related methods. In accordance with one embodiment, a ladder is provided which includes at least one fiberglass component having a color of pantone 376C.

In one embodiment, the fiberglass component includes a rail.

In one embodiment, the ladder further comprises a plurality of rungs coupled with the rail.

In one embodiment, the fiberglass component exhibits a minimum absorbance of light at a wavelength of approximately 536 nm.

In accordance with another particular embodiment, a ladder is provided including at least one fiberglass component having a color of pantone 383C.

In one embodiment, the fiberglass component includes a rail.

In one embodiment, the ladder further comprises a plurality of rungs coupled with the rail.

In one embodiment, the fiberglass component exhibits a minimum absorbance of light at a wavelength of approximately 536 nm.

In another particular embodiment, a method is provided for fabricating a fiberglass component, the method including providing a resin and a plurality of fiberglass fibers, and adding a pigment to the resin to provide a color of pantone 376C to the fiberglass component.

In one embodiment, the method further comprises forming a shape from the resin and fibers.

In one embodiment, forming a shape includes pultruding the shape.

In one embodiment, pultruding the shape includes forming a rail for a ladder.

In one embodiment, the method further comprises altering the color to pantone 383C.

In one embodiment, altering the color to pantone 383C includes exposing the shape to UV rays.

In one embodiment, resin includes a polyurethane resin.

In one embodiment, the polyurethane resin comprises polyol and isocyanate.

BRIEF DESCRIPTION OF THE DRAWINGS

The patent or application file contains at least one drawing or photograph executed in color. Copies of this patent or patent application publication with color drawing(s) will be provided by the Office upon request and payment of the necessary fee.

The foregoing and other advantages of the invention will become apparent upon reading the following detailed description and upon reference to the drawings in which.

DETAILED DESCRIPTION

Figure 3:
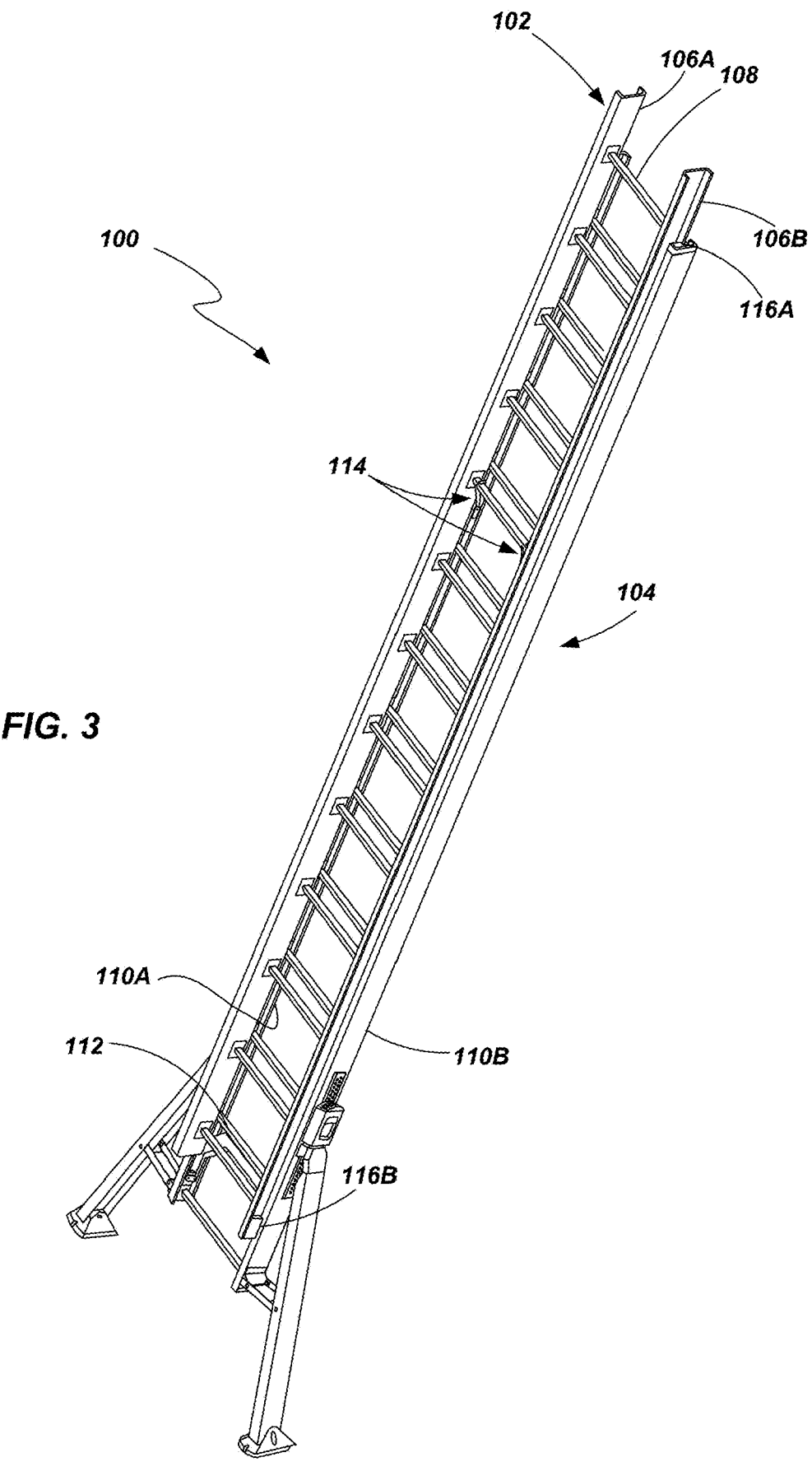
FIG. 3 is a perspective view of a ladder according to an embodiment of the present disclosure.

Referring to FIG. 3, a ladder 100 is shown according to an embodiment of the disclosure. The ladder 100 is configured as an extension ladder and includes a first assembly, which may be referred to as a fly section 102, and a second assembly, which may be referred to as a base section 104. The fly section 102 is slidably coupled with the base section 104 so as to adjust the ladder 100 to various lengths (or, rather, heights). The fly section 102 includes a pair of spaced apart rails 106A and 106B (generally referenced as 106 herein for purposes of convenience) with a plurality of rungs 108 extending between, and coupled to, the rails 106. Similarly, the base section 104 includes a pair of spaced apart rails 110A and 110B (generally referenced herein as 110 for purposes of convenience) with a plurality of rungs 112 extending between, and coupled to, the rails 110.

In one embodiment, the rails 106 and 110 may be formed of a composite material such as a fiberglass composite material. The rails 106 and 110 may be formed using a variety of manufacturing techniques. For example, in one embodiment, the rails may be formed using pultrusion or other appropriate processes associated with composite manufacturing. In one embodiment, the rails 106 and 110 may be formed generally as C-channel members exhibiting a substantially "C-shaped" cross-sectional geometry.

The rungs 108 and 112 may also be formed from a variety of materials using a variety of manufacturing techniques. For example, in one embodiment, the rungs 108 and 112 may be formed from an aluminum material through an extrusion process. However, such an example is not to be viewed as being limiting and numerous other materials and methods may be utilized as will be appreciated by those of ordinary skill in the art. In one embodiment the rungs 108 and 112 may include a flange member (also referred to as a rung plate) for coupling to associated rails 106 and 110. For example, the flanges may be riveted or otherwise coupled with their associated rails 106 and 110. Examples of rungs and flanges according to certain embodiments are described in U.S. Patent Application Publication No. 2016/0123079, published on May 5, 2016, the disclosure of which is incorporated by reference herein in its entirety.

One or more mechanisms, often referred to as a rung lock 114, may be associated with the first and second assemblies 102 and 104 to enable selective positioning of the fly section 102 relative to the base section 104. This enables the ladder 100 to assume a variety of lengths (or, rather, heights when the ladder is in an intended operating orientation) by sliding the fly section 102 relative to the base section 104 and locking the two assemblies in a desired position relative to one another. By selectively adjusting the two rail assemblies (i.e., fly section 102 and base section 104) relative to each other, a ladder can be extended in length to nearly double its height as compared to its collapsed or shortest state as will be appreciated by those of ordinary skill in the art. The rung lock 114 is cooperatively configured with the fly section 102 and the base section 104 such that when the fly section 102 is adjusted relative to the base section 104, the associated rungs 106 and 110 maintain a consistent spacing (e.g., 12 inches between rungs that are immediately adjacent, above or below, a given rung). Examples of rung locks according to certain embodiments are described in the previously incorporated U.S. Patent Publication No. 2016/0123079.

The ladder 100 may additionally include a number of other components such as bearing members 116A and 116B, which may be positioned, for example, at or adjacent an end of a rail of either the fly section 102 or the base section (although they may be positioned at locations intermediate of rail ends as well), to help maintain the fly section 102 and base section 104 in their slidably coupled arrangement and also to maintain the unique spacing of the rails of each section 102 and 104 as further discussed below. In certain embodiments, these bearing members 116A and 116B may be configured to provide improved strength and rigidity to the ladder 100 while accommodating the slidable coupling of the fly section 102 with the base section 104.

Figure 1B:
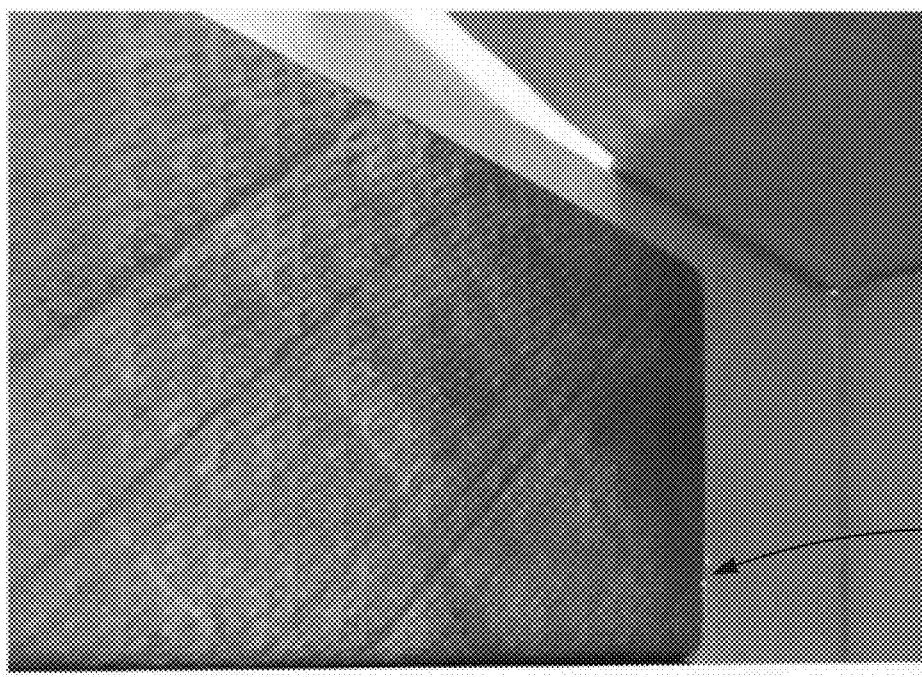
FIGS. 1A and 1B show a first set of prior art fiberglass components before and after environmental exposure, respectively.
Figure 1A:
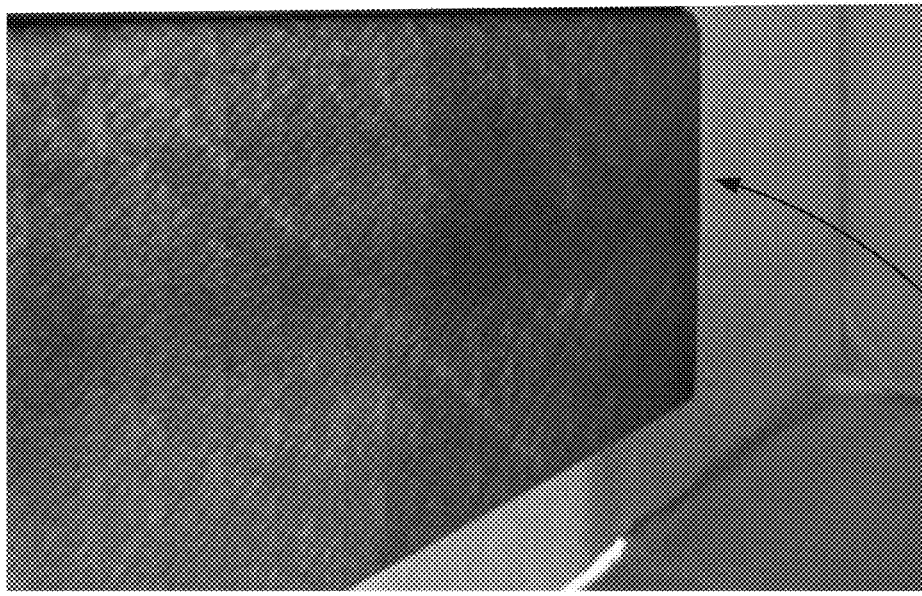
Figure 2B:
FIGS. 2A and 2B shows a second set of prior art fiberglass components before and after environmental exposure, respectively.
Figure 2A:
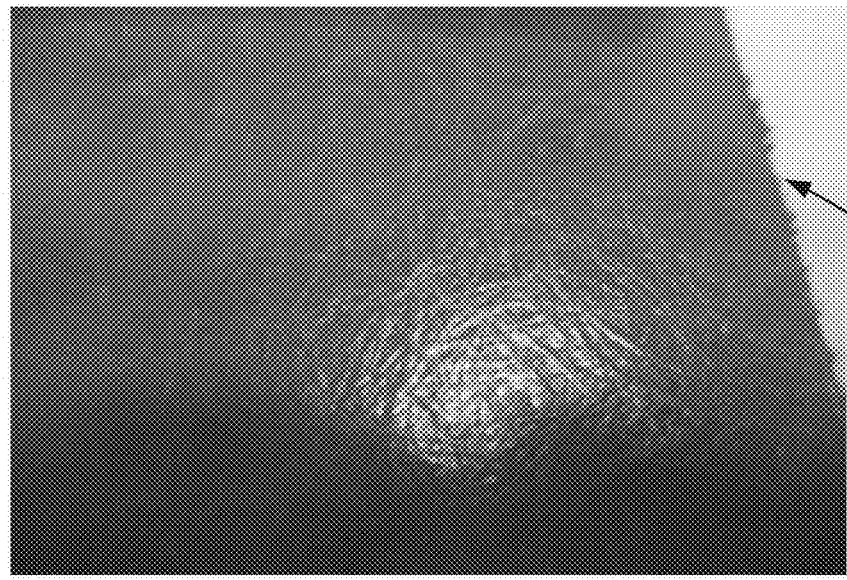

As described above, in various prior art components, fading can be seen in FIGS. 1A and 1B wherein color photos depict a prior art sample shown as a newly fabricated, black resin-based component 10) e.g., fiberglass material) prior to weathering/environmental exposure (see FIG. 1A) and as a faded black resin-based component 12 after weathering/exposure (see FIG. 1B). Another example of this fading can be seen in FIGS. 2A and 2B, wherein color photos depict a prior art sample that is shown as a newly fabricated orange resin-based component 20 (e.g., fiberglass material) prior to weathering/environmental exposure (see FIG. 2A) and as a faded orange resin-based component 22 after weathering/exposure (see FIG. 2B). It is clear that the hue and/or saturation of color of these prior art fiberglass components lightens subsequent to exposure to environmental conditions, significantly altering its appearance.

In accordance with one embodiment of the present disclosure, the rails (or other components) may be made of a fiberglass material having a specific color that provides a number of various advantages over prior art configurations. For example, the composite components may be configured with a color that provides high visibility for users and others that may be working or otherwise functioning in proximity to the ladder. In another example, the composite components may be configured to substantially retain saturation, rather than fading, even after exposure to environmental conditions such as UV rays from the sun.

In one particular example, the fiberglass components (e.g., the rails 106A, 106B, 110A and 110B) may be formed of a fiberglass material having a high-visibility green color. One example of a high-visibility green includes a color classified as pantone 376C. In one embodiment, the fiberglass materials may be formed to exhibit an initial color that is classified as pantone 376C. It has been found that use of such a color not only provides a high visibility to the fiberglass component (e.g., a ladder rail), but also, unexpectedly, does not fade when exposed to environmental conditions. Rather, it has been discovered that fiberglass components configured with such a color actually darken in their appearance after exposure to significant UV light to a color that may be classified as pantone 383C.

In forming a fiberglass component exhibiting a high-visibility green color such as described above, an appropriate pigment may be added to the resin to provide the initial color (e.g., pantone 376C). While other resins may be used (e.g., polyester, vinylester or epoxy resins), in one particular embodiment, a two-part polyurethane resin may be used which includes polyol as one part and isocyanate as the second part. In one example embodiment, a pigment, such as that available from Chromaflo Technologies Corp., having a headquarters at Ahtabula, OH, under pigment number HDR-55390 PMS 375C GREEN, may be added to the resin to obtain the desired color. The resin may be used in the fabrication of fiberglass components, such as by a pultrusion process or other appropriate means of fabrication.

Figures 4A, 4B:
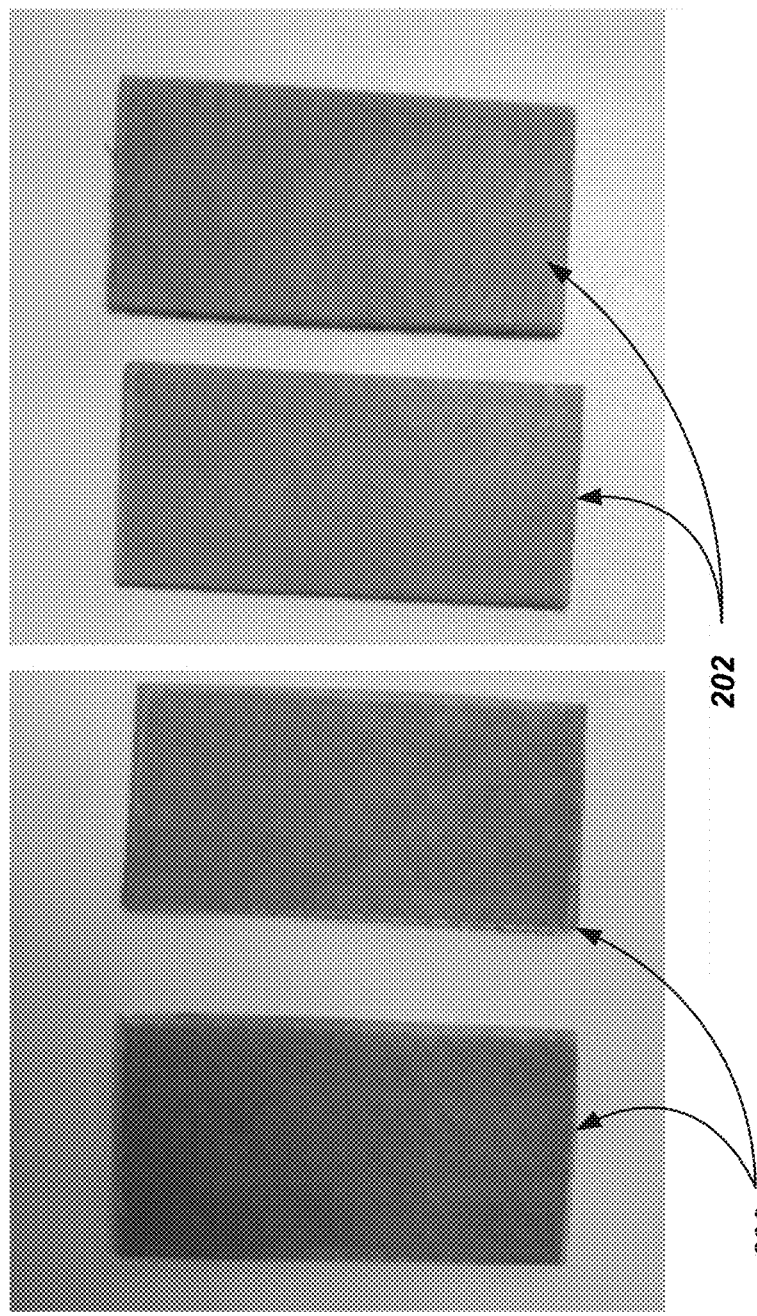
FIGS. 4A and 4B are photographs comparing fabricated fiberglass components with accelerated-weather-tested fiberglass components according to an embodiment of the present disclosure.

Referring briefly to FIG. 4A, in one embodiment, fiberglass components 200 were formed using the above techniques to provide the fiberglass component with an initial color of pantone 376C. The components 200 were then subjected to testing in a QUV accelerated weather tester which is used to reproduce the results of exposure to sunlight, rain and dew. In one particular test, the components 200 were subjected to 1,000 hours of exposure which is intended to approximate a full year of exposure to the South Florida sun and accompanying environment (e.g., humidity, rain, etc.). As shown in FIG. 4B, the tested components 202 (i.e., after exposure to 1,000 hours of exposure in the QUV accelerated weather tester), unexpectedly, did not fade or exhibit a hazy appearance as conventional fiberglass materials do. Instead, the tested components 202 actually darkened in hue and/or saturation.

This unexpected result provides a solution to both providing high-visibility to fiberglass components (e.g., a ladder component such as a rail) as well as durability in the appearance and finish of the fiberglass components, particularly when exposed to environmental conditions such as sun light, humidity, due, rain, snow, etc.

Figure 5:
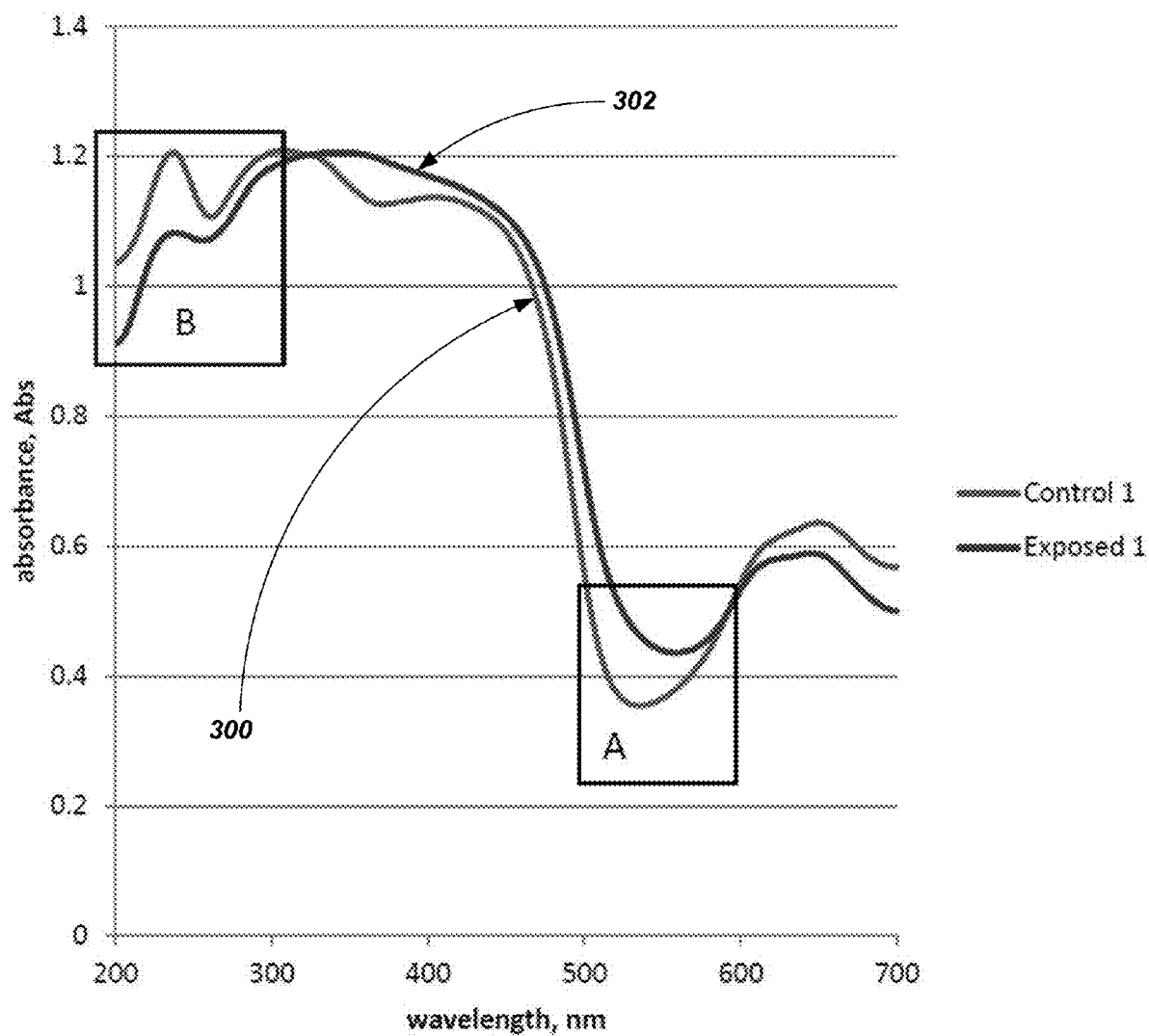
FIG. 5 is a graph showing absorbance as a function of wavelength for a first set of sample fiberglass components according to an embodiment of the present disclosure.

Referring now to FIG. 5, a graph shows testing results for a first sample (including a graph 300 for a first control sample—referred to as "Control 1"—and a graph 302 for a first exposed sample—referred to as "Exposed 1"). The graph depicts absorbance of the sample on the vertical axis vs. wavelength of light depicted along the horizontal axis. Table 1 set forth below set forth relevant data for the graph.

TABLE 1

| Peak # | $\lambda_{max}$ (nm) | Height (Abs) | $\lambda_{min}$ (nm) | Height (Abs) |
|---|---|---|---|---|
| Control 1 | | | | |
| 1 | 650 | 0.637 | 536 | 0.354 |
| 2 | 404 | 1.137 | 370 | 1.126 |
| 3 | 308 | 1.209 | 260 | 1.107 |
| 4 | 236 | 1.206 | 200 | 1.035 |
| Exposed 1 | | | | |
| 1 | 646 | 0.589 | 560 | 0.436 |
| 2 | 350 | 1.205 | 256 | 1.071 |
| 3 | 238 | 1.082 | 200 | 0.912 |

Figure 6:
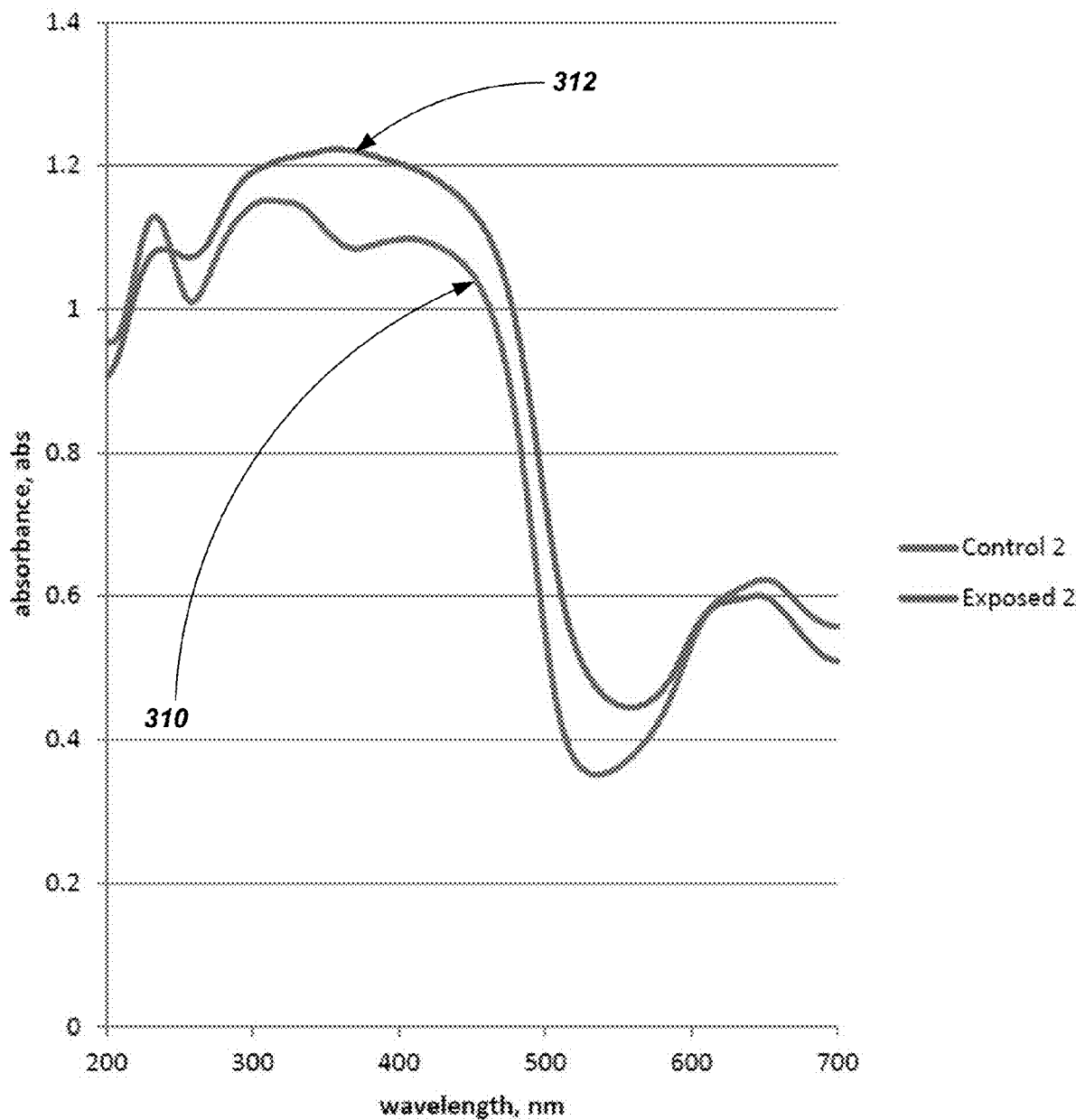
FIG. 6 is a graph showing absorbance as a function of wavelength for a second set of sample fiberglass components according to an embodiment of the present disclosure.

Referring to FIG. 6, a graph shows testing results for a second sample (including a graph 310 for a second control sample—referred to as "Control 2"—and a graph 312 for a second exposed sample—referred to as "Exposed 2"). The graph depicts absorbance of the sample on the vertical axis vs. wavelength of light depicted along the horizontal axis. Table 2 set forth below set forth relevant data for the graph.

TABLE 2

| Peak # | $\lambda_{max}$ (nm) | Height (Abs) | $\lambda_{min}$ (nm) | Height (Abs) |
|---|---|---|---|---|
| Control 2 | | | | |
| 1 | 650 | 0.623 | 536 | 0.351 |
| 2 | 408 | 1.098 | 370 | 1.084 |
| 3 | 310 | 1.151 | 258 | 1.010 |
| 4 | 234 | 1.129 | 200 | 0.955 |
| Exposed 2 | | | | |
| 1 | 646 | 0.601 | 558 | 0.445 |
| 2 | 356 | 1.223 | 256 | 1.072 |
| 3 | 238 | 1.084 | 200 | 0.907 |

With reference to FIGS. 5 and 6, and TABLES 1 and 2, it is noted that specimens similar to those shown and described with respect to FIGS. 4A and 4B (e.g., the "exposed samples being subjected to environmental conditions or simulations as described above) were analyzed as to their reflectance/absorbance properties. As can be seen, the minimum absorbance (i.e., "Peak #1" in TABLES 1 and 2 for each of the samples—and as identified in box "A" in FIG. 5), which corresponds with maximum reflectance, shifts from a wavelength of 536 nm to a wavelength of 560 nm (Exposed 1) or 558 nm (Exposed 2), while maintaining a relatively low level of absorbance (and, thus, a high level of reflectance). Further, it is noted that the absorbance of light in the UV spectrum decreases, as shown in box "B" in FIG. 5 for the exposed sample. This may provide further advantages in the specimen resisting UV light and the associated damage that might be incurred by exposure thereto.

While an extension ladder is shown in FIG. 3, the colors and processes described herein may be used in other forms of ladders as well, including step ladders, step stools, platform ladders, articulating ladders (or other combination type ladders), or any type of ladder wherein a portion of the ladder is formed of fiberglass or other composite materials utilizing a colored resin. Additionally, embodiments of the present disclosure may be applied to or combined with ladder accessories including trays, platforms and other devices. Some examples of other ladder types as well as ladder components and accessories include those described in U.S. Provisional Patent Application No. 62/404,672 filed on Oct. 5, 2016, U.S. Pat. No. 8,365,865, issued Feb. 5, 2013, to Moss et al., U.S. Pat. No. 9,145,733 issued Sep. 29, 2015, Worthington et al., and U.S. Patent Application Publication No 2015/0068842, published on Mar. 12, 2015, U.S. Pat. No. 8,376,087, issued on Feb. 19, 2013, U.S. Pat. No. 8,701,831, issued on Apr. 22, 2014, U.S. Pat. No. 7,086,499, issued Aug. 8, 2006, U.S. Pat. No. 8,997,930, issued Apr. 7, 2015, and U.S. Pat. No. 9,163,455, issued Oct. 20, 2015, the disclosures of each of which are incorporated herein in their entireties.

Additionally, the present invention is useful in any type of fiberglass component (or other components formed from resin based materials) exclusive of ladders.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of fabricating a fiberglass component, the method comprising:
   providing a resin and a plurality of fiberglass fibers;
   adding a pigment to the resin, wherein the resin becomes pigmented resin and exhibits a color of pantone 376C; and
   adding the pigmented resin to the plurality of fiberglass fibers.

2. The method according to claim 1, further comprising forming a shape from the pigmented resin and fibers.

3. The method according to claim 2, wherein forming the shape includes pultruding the shape.

4. The method according to claim 3, wherein pultruding the shape includes forming a rail for a ladder.

5. The method according to claim 2, further comprising altering the color to pantone 383C.

6. The method according to claim 5, wherein altering the color to pantone 383C includes exposing the shape to UV rays.

7. The method according to claim 1, wherein the pigmented resin is a polyurethane resin.

8. The method according to claim 7, wherein the polyurethane resin comprises polyol and isocyanate.

9. A method of fabricating a fiberglass component, the method comprising:
   providing a resin and a plurality of fiberglass fibers;
   adding a pigment to the resin to provide a color of pantone 376C;
   forming a shape from the resin and the plurality of fiberglass fibers; and
   altering the color of the resin to pantone 383C by exposing the shape to an environmental condition after forming the shape.

10. The method of claim 9, wherein exposing the shape to the environmental condition includes exposing the shape to ultraviolet (UV) rays.

11. A method of fabricating a fiberglass component, the method comprising:
    providing a resin and a plurality of fiberglass fibers;
    adding a pigment to the resin, wherein the resin comprises a first color;
    forming a shaped article with the resin and the plurality of fiberglass fibers after adding the pigment;
    exposing the shaped article to ultraviolet (UV) rays, thereby altering the first color of the resin to a second color, the second color being deeper than the first color in hue or saturation.

12. The method of claim 11, wherein the first color is pantone 376C.

13. The method of claim 11, wherein the second color is pantone 383C.

14. The method of claim 11, wherein the first color comprises a minimum absorbance of light having a wavelength of about 536 nanometers.

15. The method of claim 14, wherein the second color comprises a minimum absorbance of light having a wavelength of about 558 nanometers or about 560 nanometers.

* * * * *